United States Patent
Matsuyama et al.

(12) 
(10) Patent No.: US 10,106,058 B2
(45) Date of Patent: Oct. 23, 2018

(54) VEHICLE SEAT

(71) Applicant: TOYOTA BOSHOKU KABUSHIKI KAISHA, Aichi-ken (JP)

(72) Inventors: Sohei Matsuyama, Aichi-ken (JP); Tomonori Ishikawa, Aichi-ken (JP); Komei Yano, Aichi-ken (JP); Kento Yoshida, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 115 days.

(21) Appl. No.: 15/164,088

(22) Filed: May 25, 2016

(65) Prior Publication Data

US 2016/0375800 A1    Dec. 29, 2016

(30) Foreign Application Priority Data

Jun. 24, 2015 (JP) ................................. 2015-126986

(51) Int. Cl.
   *B60N 2/07*   (2006.01)
   *B60N 2/06*   (2006.01)

(52) U.S. Cl.
   CPC ........... *B60N 2/0722* (2013.01); *B60N 2/067* (2013.01); *B60N 2/0727* (2013.01); *B60N 2/0735* (2013.01)

(58) Field of Classification Search
   CPC ...... B60N 2/067; B60N 2/072; B60N 2/0702; B60N 2/0747; B60N 2/0735; B60N 2/0722
   See application file for complete search history.

(56) References Cited

U.S. PATENT DOCUMENTS

| 5,094,420 A | * | 3/1992 | Aihara | ................... | B60N 2/067 248/419 |
| 5,582,381 A | * | 12/1996 | Graf | ....................... | B60N 2/071 248/430 |
| 6,012,695 A | * | 1/2000 | Bauer | .................. | B60N 2/0705 248/430 |

(Continued)

FOREIGN PATENT DOCUMENTS

| DE | 35 21 836 | 1/1987 |
| DE | 197 38 383 | 3/1999 |

(Continued)

OTHER PUBLICATIONS

Official Action, along with English-language translation thereof, in DE Appl. No. 10 2016 210 390.3 dated Mar. 23, 2017.

*Primary Examiner* — Timothy J Brindley
(74) *Attorney, Agent, or Firm* — Greenblum & Bernstein, P.L.C.

(57) ABSTRACT

A vehicle seat includes a cushion frame, a base portion, and a guide structure. The guide structure includes a rail and a rolling mechanism. The rolling mechanism includes an upper guide roller, a lower guide roller, and a roller holder. The rolling mechanism is sandwiched by an upper rolling surface and a lower rolling surface of the rail. The guide structure is configured such that when an occupant load is input to the cushion frame, the guide roller and the rolling surface at one of a first contact point or a second contact point come relatively close together, such that pressure increases, due to a relative position of the roller holder and the rail changing, with the other of the first contact point or the second contact point as a reference point.

5 Claims, 5 Drawing Sheets

(56) References Cited

U.S. PATENT DOCUMENTS

| | | | | |
|---|---|---|---|---|
| 6,105,920 | A * | 8/2000 | Gauger | B60N 2/067 248/429 |
| 6,220,642 | B1 * | 4/2001 | Ito | B60N 2/0232 248/429 |
| 2001/0015401 | A1 * | 8/2001 | Yoshida | B60N 2/0715 248/430 |
| 2005/0285008 | A1 * | 12/2005 | Beneker | B60N 2/0705 248/430 |
| 2006/0131943 | A1 * | 6/2006 | Iwatani | B60N 2/067 297/344.21 |
| 2008/0023613 | A1 * | 1/2008 | Brewer | B60N 2/0232 248/429 |
| 2010/0201173 | A1 * | 8/2010 | Boes | B60N 2/0705 297/344.1 |
| 2011/0095161 | A1 * | 4/2011 | Hayashi | B60N 2/0707 248/430 |
| 2011/0108697 | A1 * | 5/2011 | Ito | B60N 2/0707 248/429 |
| 2011/0233371 | A1 | 9/2011 | Kitamura et al. | |
| 2012/0145869 | A1 * | 6/2012 | Kimura | B60N 2/0705 248/430 |
| 2012/0305734 | A1 * | 12/2012 | Balin | B60N 2/072 248/430 |
| 2013/0075571 | A1 * | 3/2013 | Suck | B60N 2/072 248/430 |

FOREIGN PATENT DOCUMENTS

| | | |
|---|---|---|
| DE | 198 37 057 | 10/1999 |
| DE | 10 2009 008 500 | 8/2010 |
| JP | 8-296639 | 11/1996 |
| JP | 2012-126167 | 7/2012 |
| WO | 2014/199757 | 12/2014 |

\* cited by examiner

VEHICLE SEAT

INCORPORATION BY REFERENCE

The disclosure of Japanese Patent Application No. 2015-126986 filed on Jun. 24, 2015 including the specification, drawings and abstract is incorporated herein by reference in its entirety.

BACKGROUND OF THE INVENTION

1. Field of the Invention

The invention relates to a vehicle seat.

2. Description of Related Art

Japanese Patent Application Publication No. 2012-126167 (JP 2012-126167 A), for example, describes a vehicle seat that includes a slide mechanism for moving a seat main body on which a seated person is seated, forward and backward. The slide mechanism described in JP 2012-126167 A has a lower rail, an upper rail, and a plurality of balls. The lower rail is arranged on a vehicle structure member such as a floor of a vehicle. The lower rail is formed by a strip-shaped metal member that has been appropriately bent into an upwardly open cylindrical shape. The upper rail is formed by a strip-shaped metal member that has been appropriately bent so as to have a hat-shaped cross-section. The upper rail fits inside the lower rail. The plurality of balls are interposed between the upper rail and the lower rail. Here, the upper rail of the slide mechanism deforms by the input of an occupant load when the seated person is seated on the seat main body. The balls are pushed and moved with the deformation of the upper rail, and press on the inside surface of the lower rail. As a result, rattling of the lower rail and the upper rail is suppressed (rattling is inhibited).

However, the balls have a small diameter in order to be interposed in a gap between the lower rail and the upper rail. Therefore, it may be difficult to suitably suppress rattling of the lower rail and the lower rail at all of the balls. Also, the upper rail of the slide mechanism described above is inserted into the lower rail. Therefore, if the deformation from the input of the occupant load is large, the sliding resistance of the upper rail with respect to the lower rail will increase, and as a result, the upper rail may not slide smoothly. Consequently, the original function of the slide mechanism may be reduced.

SUMMARY OF THE INVENTION

The invention thus provides a vehicle seat that suppresses both sliding resistance in a mechanism that slides a seat main body in a front-rear direction (i.e., forward and backward), and rattling within the mechanism.

One aspect of the invention relates to a vehicle seat that includes a cushion frame, a base portion that supports the cushion frame, and a guide structure by which the cushion frame is movably guided in a front-rear direction with respect to the base portion. The guide structure is configured such that a rail that is continuous in the front-rear direction, and a rolling mechanism that rolls inside the rail, are interposed between the cushion frame and the base portion. The rolling mechanism includes an upper guide roller formed in a relatively high position, a lower guide roller formed in a relatively low position, and a roller holder that rotatably supports the upper guide roller and the lower guide roller. The rolling mechanism is sandwiched by an upper rolling surface of the rail, on which the upper guide roller rolls, and a lower rolling surface of the rail, on which the lower guide roller rolls. The guide structure is configured such that when an occupant load is input to the cushion frame, the guide roller and the rolling surface at one of a first contact point where the upper guide roller contacts the upper rolling surface or a second contact point where the lower guide roller contacts the lower rolling surface come relatively close together, such that pressure increases, due to a relative position of the roller holder and the rail changing, with the other of the first contact point or the second contact point as a reference point.

According to this aspect, the rail that is continuous in the front-rear direction, and the rolling mechanism that rolls inside the rail, are interposed between the cushion frame and the base portion. Also, the rolling mechanism includes the upper guide roller formed in a relatively high position, the lower guide roller formed in a relatively low position, and the roller holder that rotatably supports the upper guide roller and the lower guide roller. Therefore, the movement of the seat main body in the front-rear direction is by the guide roller formed inside the rail, so sliding resistance when the guide roller rolls on the rail is able to be suppressed. Also, the guide structure is configured such that when an occupant load is input to the cushion frame, the guide roller and the rolling surface at one of a first contact point where the upper guide roller contacts the upper rolling surface or a second contact point where the lower guide roller contacts the lower rolling surface come relatively close together, such that pressure increases, due to a relative position of the roller holder and the rail changing, with the other of the first contact point or the second contact point as a reference point. That is, the guide structure suppresses rattling by the guide roller and the rolling surface coming relatively close together such that pressure increases, as the occupant load is input. Thus, in the vehicle seat, both sliding resistance of the mechanism that moves the seat main body in the front-rear direction, and rattling inside this mechanism, are able to be suppressed.

Next, in the aspect described above, the rail may include a front rail that is on a relatively front side in the front-rear direction of the cushion frame, and a rear rail that is on a relatively rear side in the front-rear direction of the cushion frame. Also, the rolling mechanism may include a front rolling mechanism that corresponds to the front rail, and a rear rolling mechanism that corresponds to the rear rail. Further, the front rail and the rear rail may be arranged in different directions in an up-down direction, and may have a trajectory of travel that guides the front side and the rear side of the cushion frame in different directions in the up-down direction when the cushion frame moves in the front-rear direction.

According to this structure, the guide structure has the front rail and the front rolling mechanism, and the rear rail and the rear rolling mechanism. Also, the front rail and the rear rail are each arranged in different directions in the up-down direction. Therefore, the seating surface angle of the seat cushion is able to be changed as the seat main body moves in the front-rear direction.

Next, in the aspect described above, the rail may be provided on the base portion side, the rolling mechanism may be provided on the cushion frame side, and the roller holder may be rotatably supported with respect to the cushion frame.

According to this structure, the guide structure is able to be formed simply.

Next, in the aspect described above, the rail may have a side rolling surface that connects the upper rolling surface to the lower rolling surface, and the rolling mechanism may have a side guide roller that rolls on the side rolling surface.

According to this structure, the rolling mechanism has the side guide roller that rolls on the side rolling surface. Therefore, the seat main body is able to be prevented from slipping sideways.

According to the aspect described above, in a vehicle seat, both sliding resistance in a mechanism that slides a seat main body in a front-rear direction (i.e., forward and backward), and rattling within the mechanism, are able to be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
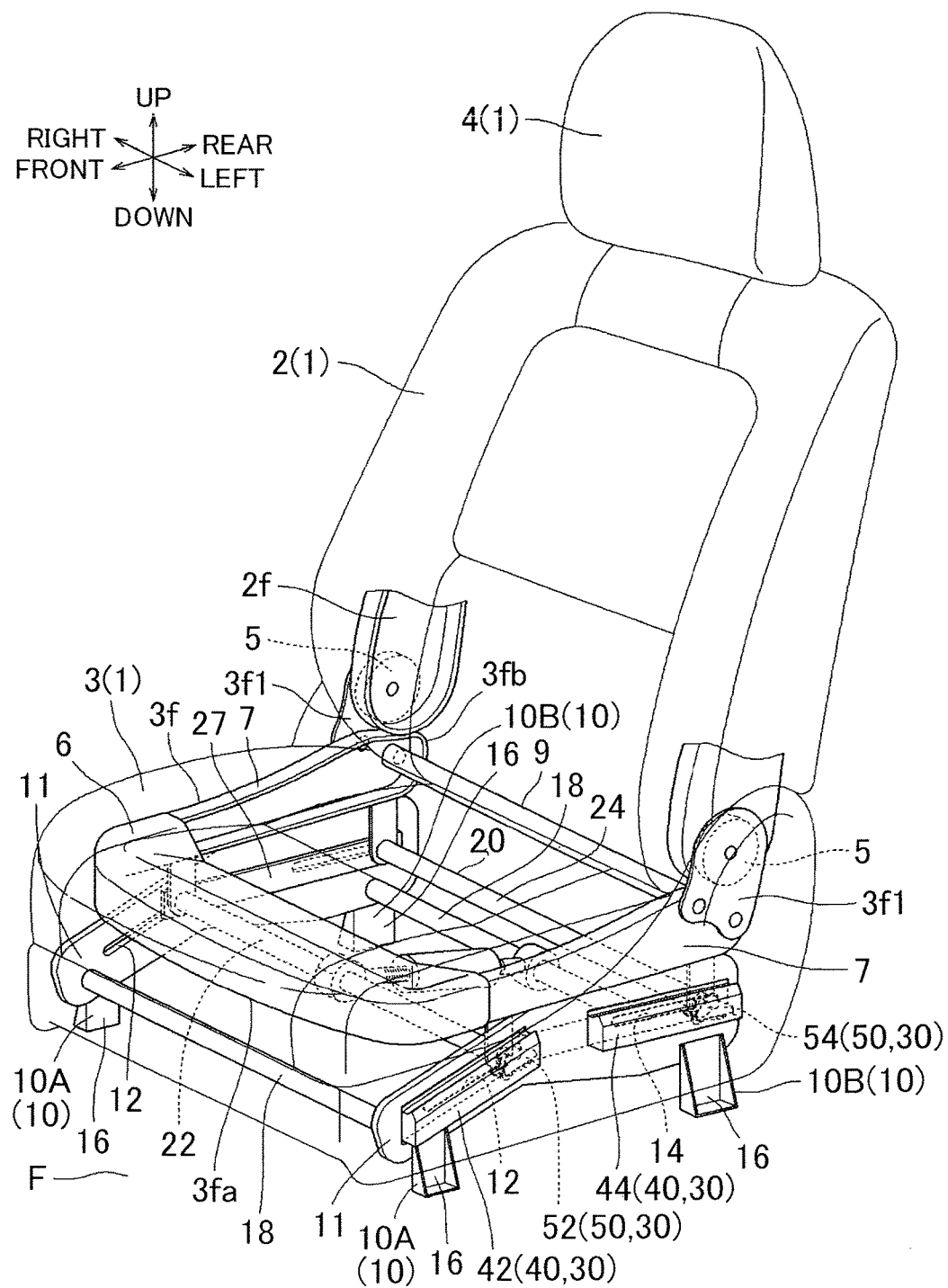
FIG. 1 is a perspective view of a vehicle seat according to one example embodiment of the invention.

Hereinafter, an example embodiment of the invention will be described with reference to FIGS. 1 to 5. In this example embodiment, a front seat of a vehicle, which is one vehicle seat, will be described as an example. The directions indicated by the arrows as appropriate in the drawings are directions that match the directions of forward, rearward (backward), up, down, left, and right when viewed by a seated person that is seated in the vehicle seat. In order to clearly describe the structure of the example embodiment, mainly the internal structure of a seat main body is shown. Therefore, regarding the seat main body 1, mainly the internal framed structure such as a frame that makes up the framework is shown, and the trim parts such as a seat pad and a cover that is fitted on the outside are either not shown or are shown simplified.

The seat main body 1 of a vehicle seat (conveyance seat) has a seatback 2 that serves as a backrest portion, a seat cushion 3 that serves as a seating portion, and a headrest 4 that serves as a headrest, as shown in FIG. 1. The seatback 2 has a back frame 2*f* that forms the framework. Only a portion of the back frame 2*f* is shown in FIG. 1; the details are not shown. The framework of the headrest 4 is also not shown in FIG. 1. The back frame 2*f* is formed in a generally rectangular frame shape by appropriately bending and drawing, for example, a pipe member and a plate member that are made of ferrous material. The seat cushion 3 has a cushion frame 3*f* that forms the framework. The cushion frame 3*f* is formed in a generally rectangular frame shape by appropriately bending and drawing, for example, a pipe member and a plate member that are made of ferrous material. Also, a pair of left and right plate-shaped lower arms 3*f*1 are attached to the rear of the cushion frame 3*f*. The seat main body 1 is connected by reclining devices 5 that are provided between lower portions of the back frame 2*f* and the lower arms 3*f*1. As a result, the seatback 2 is able to tilt forward with respect to the seat cushion 3, and the backrest angle of the seatback 2 with respect to the seat cushion 3 is able to be adjusted.

The cushion frame 3*f* has a front frame 6, a pair of left and right side frames 7, and a rear rod 9, and is formed in a generally rectangular frame shape, as shown in FIG. 1. The pair of left and right side frames 7 are made of long strip-shaped plate members and stand upright approximately the same distance apart as the width of the seat cushion 3, with a length direction parallel to a vehicle front-rear direction, above a floor surface F that is a vehicle structure member such as a floor of a vehicle. The front frame 6 extends between front ends of the side frames 7, and forms a front end of the cushion frame 3*f*. The rear rod 9 that is made of a pipe member of ferrous material extends in a width direction between the side frames 7, at the rear of the side frames 7.

Furthermore, the cushion frame 3*f* has a lower frame 20 below it. The lower frame 20 is a frame for attaching a rolling mechanism that forms a guide roller inside of which a rolling bearing is housed. The lower frame 20 is formed in a generally rectangular frame shape by a pair of right and left side plates 27 and front and rear pipes 22 and 24. A spindle 29 (see FIG. 3) protrudes toward the outside of a side portion of each side plate 27. The lower frame 20 is such that the front and rear pipes 22 and 24 are connected to the side frames 7. The front and rear pipes 22 and 24 are pipe members of ferrous material.

Figure 2:
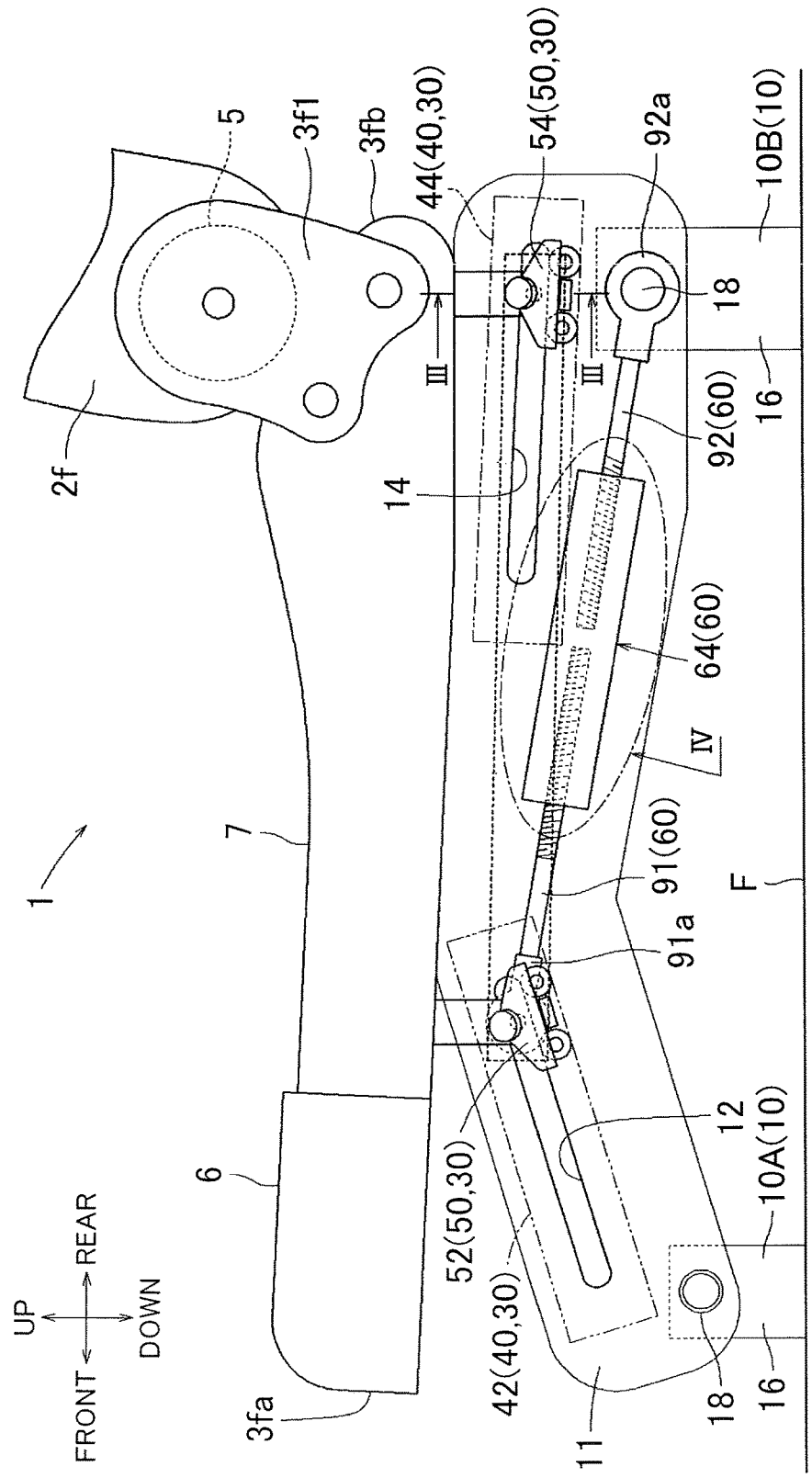
FIG. 2 is a side view of the vehicle seat according to the example embodiment.

The cushion frame 3*f* described above is supported at a position up away from the floor surface F by a cushion base 10 (a base portion), as shown in FIGS. 1 and 2. The cushion base 10 is formed in a generally rectangular frame shape by a front leg portion 10A, rear leg portion 10B, and a pair of left and right rail frames 11. The front leg portion 10A and the rear leg portion 10B of the cushion base 10 have basically the same structure, so the front leg portion 10A will be representatively described. The front leg portion 10A has brackets 16 and a pipe 18, as shown in FIGS. 1 and 2. The brackets 16 and the pipe 18 are made of ferrous material. The brackets 16 are provided in a pair, i.e., one left and one right in the width direction of the cushion frame 3*f*, and are connected to the floor surface F. The pipe 18 extends in the width direction of the seat main body 1, between the left and right brackets 16, and is welded and fixed to these brackets 16. The rail frames 11 extend between the front leg portion 10A and the rear leg portion 10B. The rail frames 11 are formed by plate-shaped members that are made of steel sheet. In this specification, the rail frames and other portions that are provided in a plurality may be referred to in the singular to simplify the description and facilitate understanding. A groove-shaped front slit 12 and a groove-shaped rear slit 14 are formed cut out of the rail frame 11 in the vehicle front-rear direction. The spindles 29 of the lower frame 20 are inserted into the front slit 12 and the rear slit 14 (see FIG. 3), and these spindles 29 are configured to be able to slide. The front end of the front slit 12 points gradually downward as it heads toward the front of the rail frame 11, and the rear end of the front slit 12 points gradually upward as it heads toward the rear of the rail frame 11. The rear slit 14 is cut substantially horizontal in the front-rear direction of the rail frame 11. The cutout direction of the front slit 12 and the rear slit 14 is designed to change the seating surface angle of the seat cushion 3 as the seat main body 1 moves in the front-rear direction. Therefore, the cutout direction of the front slit 12 and the rear slit 14 can be applied to various directions depending on the arrangement of the seating surface angle. Here, a front portion 3*fa* that is on the relatively front side in the front-rear direction of the cushion frame 3*f*, is supported on the front leg portion 10A side. A rear portion 3*fb* that is on the relatively rear side in the front-rear direction of the cushion frame 3*f*, is supported on the rear leg portion 10B side.

A guide structure 30 by which the cushion frame 3*f* is movably guided in the front-rear direction with respect to the cushion base 10 is interposed between the cushion frame 3*f* and the cushion base 10 (the base portion). More specifically, this guide structure 30 is interposed between the lower frame 20 and the rail frames 11 of the cushion base 10 (the base portion). The guide structure 30 includes a rail 40 that is continuous in the front-rear direction, and a rolling mechanism 50 that rolls inside the rail 40.

The rail 40 includes a front rail 42 on a relatively front side in the front-rear direction of the cushion frame, and a rear rail 44 on a relatively rear side in the front-rear direction of the cushion frame. More specifically, the front rail 42 is arranged corresponding to the front slit 12 in the rail frame 11, and the rear rail 44 is arranged corresponding to the rear slit 14 in the rail frame 11.

The rolling mechanism 50 includes a front rolling mechanism 52 on a relatively front side in the front-rear direction of the cushion frame 3*f*, and a rear rolling mechanism 54 on the relatively rear side in the front-rear direction of the cushion frame 3*f*. That is, the rolling mechanism 50 includes the front rolling mechanism 52 that corresponds to the front rail 42, and the rear rolling mechanism 54 that corresponds to the rear rail 44. The front rolling mechanism 52 and the rear rolling mechanism 54 are formed in left and right pairs next to the lower frame 20.

Here, the structures of the front rail 42 and the front rolling mechanism 52 are basically the same as the structures of the rear rail 44 and the rear rolling mechanism 54, so the rear rail 44 and the rear rolling mechanism 54 will be representatively described, and a detailed description of the structures of the front rail 42 and the front rolling mechanism 52 will be omitted.

The rear rolling mechanism 54 has an upper guide roller 54*a*, a side guide roller 54*b*, a lower guide roller 54*c*, and a roller holder 55. The roller holder 55 is a member that rotatably supports the upper guide roller 54*a*, the side guide roller 54*b*, and the lower guide roller 54*c*. The roller holder 55 is formed by appropriately bending a plate member made of steel sheet in a general U-shape. The roller holder 55 is rotatably supported with respect to the spindle 29 (see FIG. 3) on an inside surface 55*x* thereof. The roller holder 55 is supported so as to be able to smoothly rotate via a rolling bearing, for example, between it (i.e., the roller holder 55) and the spindle 29. The upper guide roller 54*a* is supported on an outside surface 55*y* of the roller holder 55. With the upper guide roller 54*a*, a rolling bearing is fit around a shaft portion. Synthetic resin is arranged all around the outer peripheral surface of the rolling bearing. In this example embodiment, the upper guide roller 54*a* is so-called cantilever-supported on the outside surface 55*y* of the roller holder 55. Also, an upper end of the outside surface 55*y* is inclined toward the inside surface 55*x* side. The lower guide roller 54*c* is supported on a lower surface 55*z* of the roller holder 55. Two of the lower guide rollers 54*c* are formed in the vehicle front-rear direction. With the lower guide rollers 54*c*, a rolling bearing is fit around a shaft portion, similar to the upper guide roller 54*a*. Synthetic resin is arranged all around the outer peripheral surface of the rolling bearing. In this example embodiment, the lower guide rollers 54*c* are so-called double-supported at the lower surface 55*z* of the roller holder 55. The side guide roller 54*b* is supported between the two lower guide rollers 54*c*. With the side guide roller 54*b*, a rolling bearing is fit around a shaft portion, similar to the upper guide roller 54*a*. Synthetic resin is arranged all around the outer peripheral surface of the rolling bearing. In this example embodiment, the side guide roller 54*b* is so-called cantilever-supported on the lower surface 55*z* of the roller holder 55. Accordingly, the roller holder 55 rotatably supports the upper guide roller 54*a* formed in a relatively high position, the lower guide rollers 54*c* formed in relatively low positions, and the side guide roller 54*b* that is formed between the lower guide rollers 54*c*. The roller holder 55 of this example embodiment has a simple shape (a generally U-shaped cross-section) by cantilever-supporting the upper guide roller 54*a* and the side guide roller 54*b*. However, the roller holder 55 may also have any one of a variety of cross-sectional shapes in order to double-support all of the guide rollers, i.e., the upper guide roller 54*a*, the side guide roller 54*b*, and the lower guide roller 54*c*.

The rear rail 44 is welded from the outside in a position corresponding to the rear slit 14 of the rail frame 11. The rear rail 44 is formed by appropriately bending a plate member made of steel sheet in a general U-shape. The rear rail 44 has an upper rolling surface 44*a*, a lower rolling surface 44*c*, and a side rolling surface 44*b*. The upper rolling surface 44*a* is a surface on which the upper guide roller 54*a* rolls. The lower rolling surface 44*c* is a surface on which the lower guide roller 54*c* rolls. The side rolling surface 44*b* is a surface on which the side guide roller 54*b* rolls. The side rolling surface 44*b* connects the upper rolling surface 44*a* to the lower rolling surface 44*c*. As a result, the rear rail 44 is configured such that the rear rolling mechanism 54 is sandwiched by the upper rolling surface 44*a*, the lower rolling surface 44*c*, and the side rolling surface 44*b*. Here, the upper rolling surface 44*a* is inclined so as to be substantially level with the rotating shaft of the upper guide roller 54*a*. The point where the upper guide roller 54*a* contacts the upper rolling surface 44*a* is a first contact point 74*a*, and the point where the lower guide roller 54*c* contacts the lower rolling surface 44*c* is a second contact point 74*c*.

Next, a shaft 60 (drive mechanism) that moves the cushion frame 3*f* with respect to the cushion base 10 via the guide structure 30 will be described. This shaft 60 (drive mechanism) includes a hollow motor 64, and a first screw shaft 91 and a second screw shaft 92 (shaft members) are directly screwed into both longitudinal ends of this hollow motor 64, as an electric drive source as shown in FIGS. 1 and 2. The overall length of the shaft 60 is displaced by the entire shaft 60 expanding and contracting by the driving of this hollow motor 64. One end of the shaft 60 is rotatably connected to the pipe 18 of the rear leg portion 10B of the cushion base 10 (the base portion), and the other end of the shaft 60 is rotatably connected to the pipe 22 at the front of the lower frame 20 of the cushion frame 3*f*. As a result, the cushion frame 3*f* is movably guided in the front-rear direction with respect to the front leg portion 10A and the rear leg portion 10B (the cushion base 10) via the guide structure 30 by the expansion and contraction of the shaft 60, and when the cushion frame 3*f* moves in the front-rear direction, the front portion 3*fa* of the cushion frame 3*f* with respect to the front leg portion 10A, and the rear portion 3*fb* of the cushion frame 3*f* with respect to the rear leg portion 10B are guided in different directions in the up-down direction. The shaft 60 may be connected by any one of a variety of modes. That is, the shaft 60 need only be configured such that one end is rotatably connected to the cushion base 10 (the base portion)

or the floor surface F, and the other end is rotatably connected to the cushion frame 3*f*.

Figure 4:
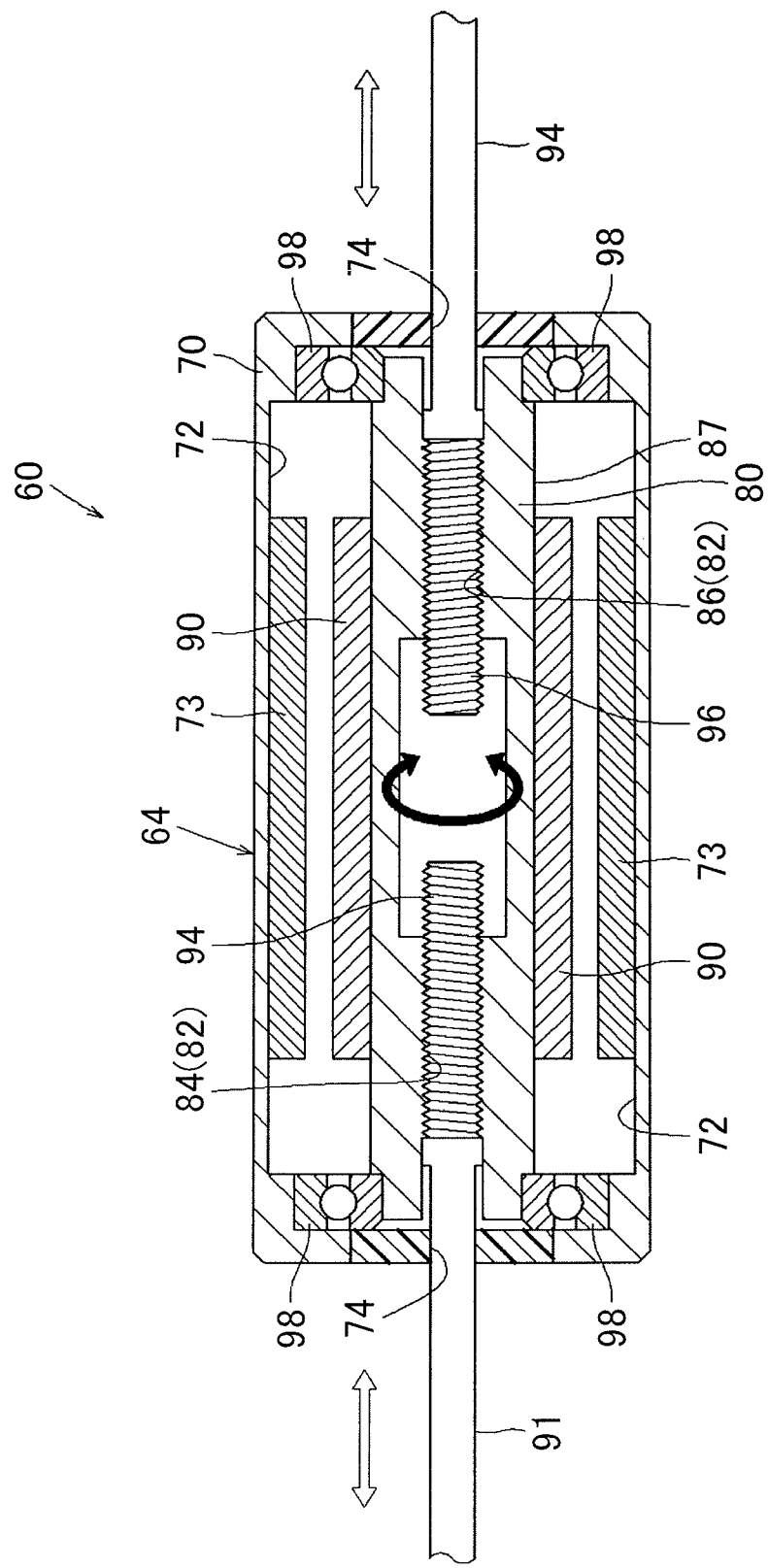
FIG. 4 is an enlarged sectional view of the internal structure of portion IV in FIG. 2.

The hollow motor 64 (the electric drive source) generally has a hollow cylindrically-shaped outer cylinder 70 as a stator, and a hollow cylindrically-shaped inner cylinder 80 as a rotor, as shown in FIG. 4. Either a brush motor or a brushless motor may be applied as the hollow motor. The hollow motor 64 has the hollow cylindrically-shaped outer cylinder 70. A plate-shaped permanent magnet 73 formed in a circular shape along an outer cylinder inner peripheral surface 72 that is the inner peripheral surface of this outer cylinder 70, is arranged along the entire periphery such that S-poles and N-poles are alternately adjacent to each other, on the outer cylinder inner peripheral surface 72 of the outer cylinder 70. Both ends of the outer cylinder 70 are covered by a lid-like member, and a slit 74 that enables the first screw shaft 91 and the second screw shaft 92 to slide in the length direction is formed through a substantially center portion of both of these lid-like members. The hollow cylindrically-shaped inner cylinder 80 is arranged concentric with the outer cylinder 70, radially inside of the outer cylinder 70. An electromagnet 90 formed by an armature coil is formed on an inner cylinder outer peripheral surface 87 that is the outer peripheral surface of the inner cylinder 80. A bearing device 98 is arranged between both ends of the inner cylinder outer peripheral surface 87 of the inner cylinder 80 and both ends of the outer cylinder inner peripheral surface 72 of the outer cylinder 70. As a result, the outer cylinder 70 and the inner cylinder 80 are concentrically arranged. Threads into which the first screw shaft 91 and the second screw shaft 92 are able to be screwed are cut into an inner cylinder inner peripheral surface 82 that is the inner peripheral surface of the inner cylinder 80. Here, the inner cylinder inner peripheral surface 82 has a right-handed threaded portion 84 in which the cutout direction of the thread is to the right, formed toward one end side, with the center in the length direction as the boundary. The inner cylinder inner peripheral surface 82 also has a left-handed threaded portion 86 in which the cutout direction of the thread is the opposite direction from the right-handed threaded portion 84, formed toward the other end side, with the center in the length direction as the boundary. The first screw shaft 91 and the second screw shaft 92 are formed by cylindrical members that are made of metal. A right-handed threaded portion 94 is formed cut out corresponding to the right-handed threaded portion 84 of the inner cylinder inner peripheral surface 82 of the inner cylinder 80, on an outer peripheral surface of one end of the first screw shaft 91. A first connecting portion 91*a* (see FIG. 2) that is able to be rotatably connected to the pipe 22 at the front of the lower frame 20 is formed on other end of the first screw shaft 91. A left-handed threaded portion 96 is formed cut out corresponding to the left-handed threaded portion 86 of the inner cylinder inner peripheral surface 82 of the inner cylinder 80, on an outer peripheral surface of one end of the second screw shaft 92. A second connecting portion 92*a* (see FIG. 2) that is able to be rotatably connected to the pipe 18 of the rear leg portion 10B of the cushion base 10 (the base portion) is formed on other end of the second screw shaft 92. In this way, the shaft 60 is such that the hollow motor 64 is provided as a middle portion that is positioned in the middle in the length direction, and the first screw shaft 91 and the second screw shaft 92 are directly screwed into this hollow motor 64 as two side portions that are adjacent to both sides in the length direction. Also, the shaft 60 is formed in a middle position, in a width direction of the seat main body 1. In this example embodiment, the first screw shaft 91 and the second screw shaft 92 as the two side portions employ a structure in which they expand and contract by overlapping in the length direction with the hollow motor 64 as the middle portion. However, the structure is not limited to this. The structure need simply be such that one of the middle portion or the two side portions expands and contracts by overlapping with the other in the length direction. Therefore, the middle portion may be configured to expand and contract by overlapping with the side portions in the length direction. In this case, the electric drive source of the middle portion does not have to be a hollow motor. The hollow motor 64 may also be such that the structures of the stator and the rotor are reversed. That is, the outer cylinder 70 may be the rotor, and the stator may be the inner cylinder 80. Also, the cutout direction of the threads of the inner cylinder 80, the first screw shaft 91, and the second screw shaft 92 may be reversed. That is, the first screw shaft 91 side may have a left-handed threaded structure, and the second screw shaft 92 side may have a right-handed threaded structure.

Figure 5:
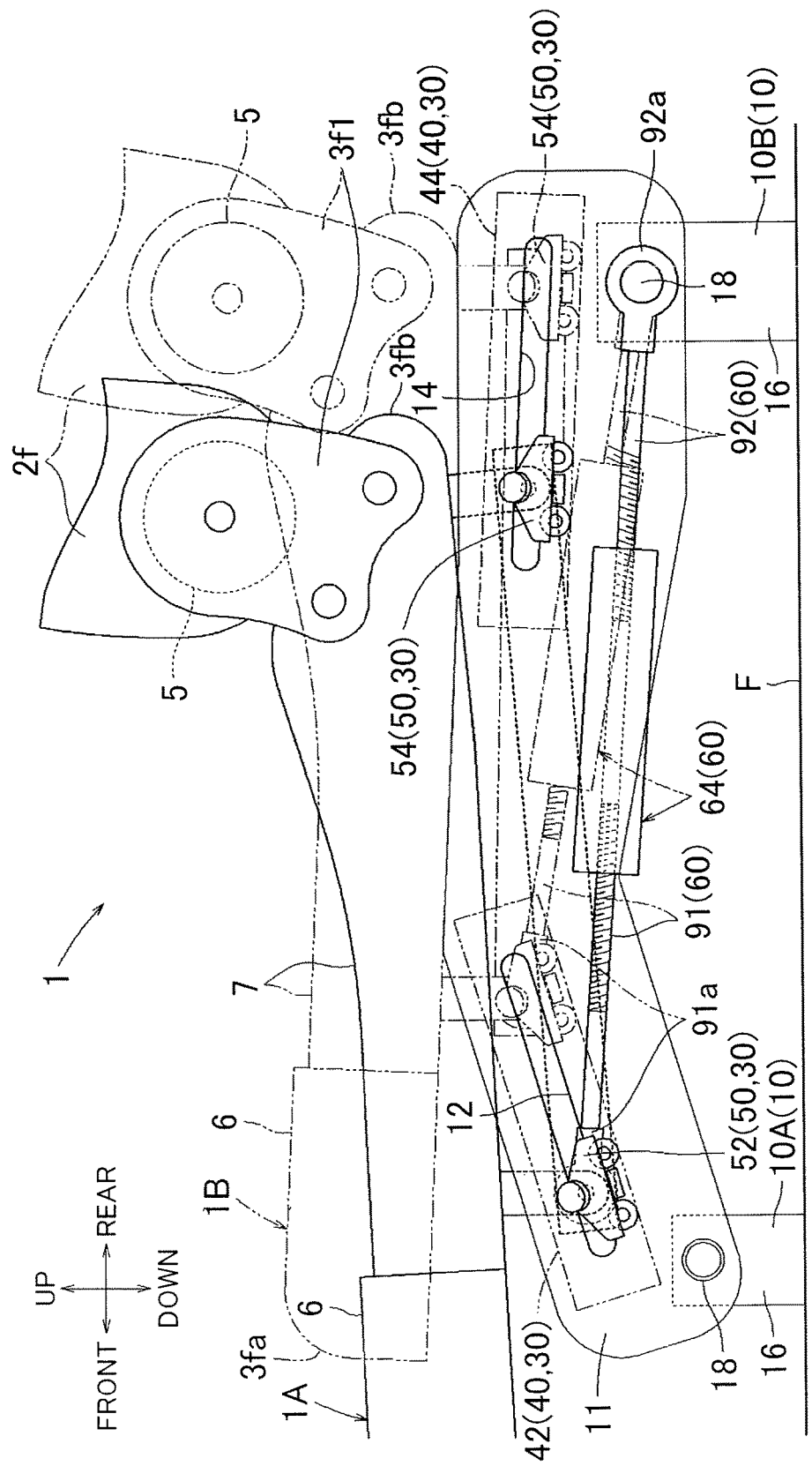
FIG. 5 is a side view illustrating forward and rearward positions to which a seat main body of the vehicle seat according to the example embodiment is moved.

Next, the operation of the vehicle seat will be described. The hollow motor 64 of the shaft 60 is driven by receiving a supply of power, as shown in FIGS. 4 and 5. The driving of the hollow motor 64 rotates the inner cylinder 80 around its axis with respect to the outer cylinder 70. When this happens, the first screw shaft 91 and the second screw shaft 92 at both ends come closer together or farther apart as they screw together with the inner cylinder 80. As a result, the entire length of the shaft 60 is displaced by the shaft 60 contracting or expanding. The seat main body 1 illustrated by the solid line in FIG. 5 shows the position of a forward position 1A in which the entire length of the shaft 60 has expanded and moved toward the front side. When the entire length of the shaft 60 contracts, the rolling mechanism 50 of the guide structure 30 rolls inside the rail 40. The cutout directions of the front slit 12 and the rear slit 14 in the rail frame 11 are different from each other. As a result, the front portion 3*fa* of the cushion frame 3*f* with respect to the front leg portion 10A moves downward as it moves forward. On the other hand, the rear portion 3*fb* of the cushion frame 3*f* with respect to the rear leg portion 10B moves substantially horizontally when it moves forward. The seat main body 1 illustrated by the virtual line in FIG. 5 shows the position of a rearward position 1B in which the entire length of the shaft 60 has contracted and moved toward the rear side. Conversely, when the entire length of the shaft 60 expands, the front portion 3*fa* of the cushion frame 3*f* with respect to the front leg portion 10A moves downward as it moves forward. On the other hand, the rear portion 3*fb* of the cushion frame 3*f* with respect to the rear leg portion 10B moves horizontally when it moves toward the rear.

Figure 3:
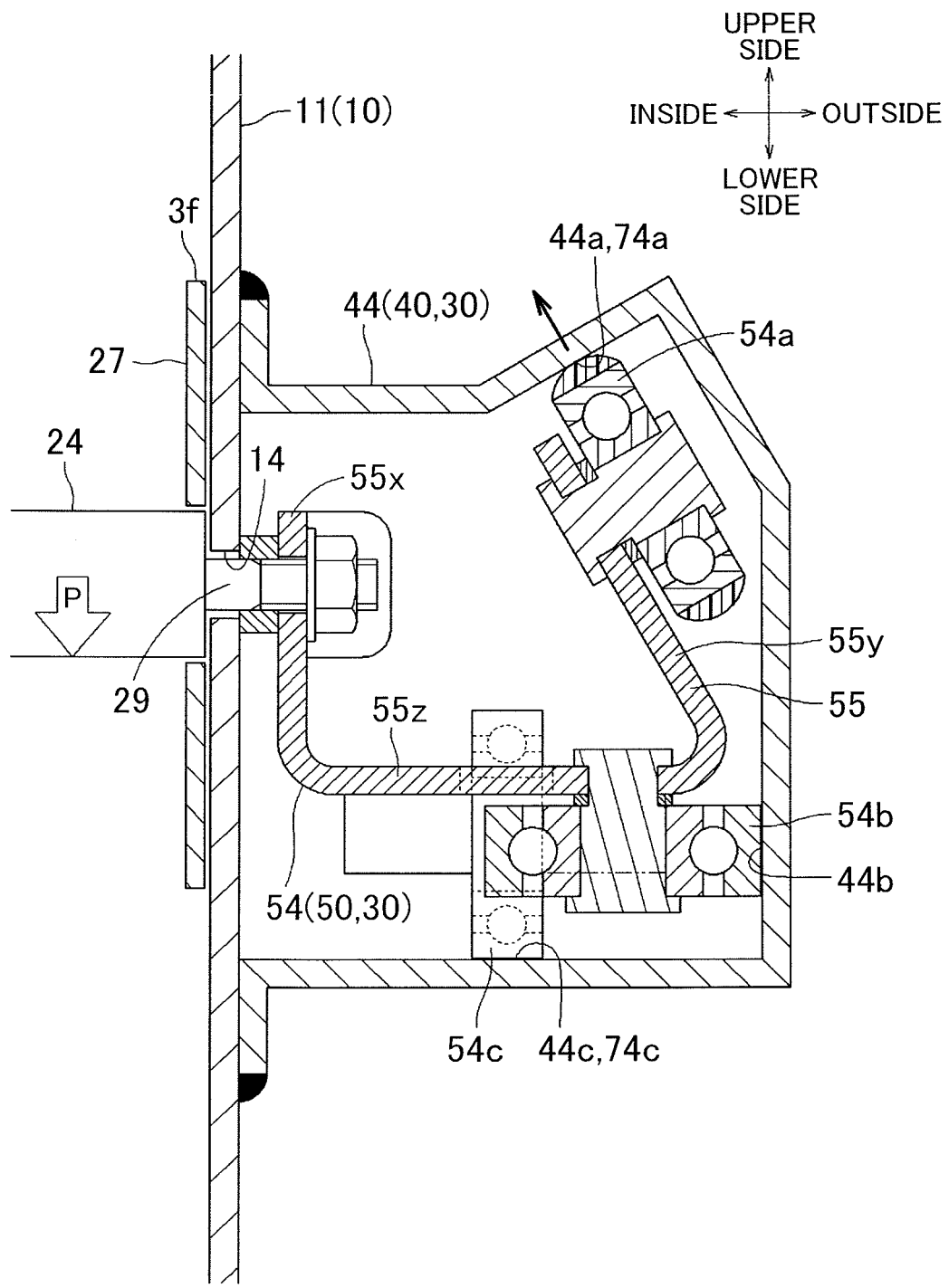
FIG. 3 is a sectional view taken along line III-III in FIG. 2.

Also, as shown in FIG. 3, the rail 40 that is continuous in the front-rear direction, and the rolling mechanism 50 that rolls inside the rail 40 are interposed between the cushion frame 3*f* and the cushion base 10 (the base portion). Also, the rolling mechanism 50 has the upper guide roller 54*a* formed in a relative high position, the lower guide roller 54*c* formed in a relatively low position, and the roller holder 55 that rotatably supports the upper guide roller 54*a* and the lower guide roller 54*c*. Here, the upper guide roller 54*a* and the lower guide roller 54*c* are rotatably supported via rolling bearings. Also, the guide structure 30 is such that when an occupant load P is input to the cushion frame 3*f*, the upper guide roller 54*a* and the upper rolling surface 44*a* of the first contact point 74*a* come relatively close together, such that pressure increases, due to the relative position of the roller holder 55 and the rail 40, with the second contact point 74*c* where the lower guide roller 54c contacts the lower rolling surface 44c as the reference point.

In this way, according to the vehicle seat (conveyance seat) of this example embodiment, the guide rollers formed inside the rail 40 are rotatably supported via the rolling bearings, so movement of the seat main body 1 in the front-rear direction is such that sliding resistance when the guide rollers roll inside the rail 40 is able to be suppressed. Also, the guide structure 30 suppresses rattling by the upper guide roller 54a and the upper rolling surface 44a coming relatively close together such that pressure increases as the occupant load is input. Thus, in a vehicle seat, both sliding resistance of the mechanism that moves the seat main body 1 in the front-rear direction, and rattling inside this mechanism, are able to be suppressed.

Further, the guide structure 30 has the front rail 42 and the front rolling mechanism 52, and the rear rail 44 and the rear rolling mechanism 54. Also, the front rail 42 and the rear rail 44 are each arranged in different directions in the up-down direction. Therefore, the seating surface angle of the seat cushion 3 is able to be changed as the seat main body 1 moves in the front-rear direction.

Also, the rail 40 is formed on the cushion base 10 (the base portion) side, the rolling mechanism 50 is formed on the cushion frame 3f side, and the roller holder 55 is rotatably supported with respect to the cushion frame 3f. This kind of structure enables the guide structure 30 to be formed simply.

Also, the rear rolling mechanism 54 has the side guide roller 54b that rolls on the side rolling surface 44b. Therefore, the seat main body 1 is able to be prevented from slipping sideways.

While an example embodiment of the invention has be described above, the vehicle seat of the invention is not limited to this example embodiment, and may be carried out in a variety of other modes. For example, the vehicle is not limited to a conveyance, and may be applied to a variety of types of vehicles such as a marine vessel or an aircraft. Also, an example in which the shaft as the drive mechanism is provided with a hollow motor as the electric drive source is given, but the shaft is not limited to this. That is, a motor other than a hollow motor may also be employed, or the drive mechanism may be a manual drive mechanism.

The guide structure 30 of the example embodiment is such that when the occupant load P is input to the cushion frame 3f, the relative position of the roller holder 55 and the rail 40 changes, with the second contact point 74c as the reference point. Here, the guide structure 30 may also be such that the rail 40 is formed on the cushion frame 3f, and the rolling mechanism 50 is formed on the cushion base 10 (the base portion). At this time, the guide structure 30 may also be such that when the occupant load P is input to the cushion frame 3f, the relative position of the roller holder 55 and the rail 40 changes with the first contact point 74a as the reference point. Also, the front rail 42 and the rear rail 44 of the rail 40 may be integrated. Further, a mode in which the side guide roller is not provided is also possible.

What is claimed is:

1. A vehicle seat comprising:
   a cushion frame;
   a base portion that supports the cushion frame; and
   a guide structure by which the cushion frame is movably guided in a front-rear direction with respect to the base portion, wherein
   the guide structure is configured such that a rail that is continuous in the front-rear direction, and a rolling mechanism that rolls inside the rail, are interposed between the cushion frame and the base portion;
   the rolling mechanism includes an upper guide roller formed in a relatively high position, a lower guide roller formed in a relatively low position, and a roller holder that rotatably supports the upper guide roller and the lower guide roller;
   the rolling mechanism is sandwiched by an upper rolling surface of the rail, on which the upper guide roller rolls, and a lower rolling surface of the rail, on which the lower guide roller rolls;
   the guide structure is configured such that when an occupant load is input to the cushion frame, the guide roller and the rolling surface at one of a first contact point where the upper guide roller contacts the upper rolling surface or a second contact point where the lower guide roller contacts the lower rolling surface come relatively close together, such that pressure increases, due to a relative position of the roller holder and the rail changing, with the other of the first contact point or the second contact point as a reference point;
   the rail includes a front rail that is on a relatively front side in the front-rear direction of the cushion frame, and a rear rail that is on a relatively rear side in the front-rear direction of the cushion frame;
   the rolling mechanism includes a front rolling mechanism that corresponds to the front rail, and a rear rolling mechanism that corresponds to the rear rail; and
   the front rail and the rear rail are arranged in different directions in an up-down direction, and have a trajectory of travel that guides the front side and the rear side of the cushion frame in different directions in the up-down direction when the cushion frame moves in the front-rear direction.

2. The vehicle seat according to claim 1, wherein:
   the rail is provided on the base portion side;
   the rolling mechanism is provided on the cushion frame side; and
   the roller holder is rotatably supported with respect to the cushion frame.

3. A vehicle seat comprising:
   a cushion frame;
   a base portion that supports the cushion frame; and
   a guide structure by which the cushion frame is movably guided in a front-rear direction with respect to the base portion, wherein
   the guide structure is configured such that a rail that is continuous in the front-rear direction, and a rolling mechanism that rolls inside the rail, are interposed between the cushion frame and the base portion;
   the rolling mechanism includes an upper guide roller formed in a relatively high position, a lower guide roller formed in a relatively low position, and a roller holder that rotatably supports the upper guide roller and the lower guide roller;
   the rolling mechanism is sandwiched by an upper rolling surface of the rail, on which the upper guide roller rolls, and a lower rolling surface of the rail, on which the lower guide roller rolls;
   the guide structure is configured such that when an occupant load is input to the cushion frame, the guide roller and the rolling surface at one of a first contact point where the upper guide roller contacts the upper rolling surface or a second contact point where the lower guide roller contacts the lower rolling surface come relatively close together, such that pressure increases, due to a relative position of the roller holder and the rail changing, with the other of the first contact point or the second contact point as a reference point;

the rail has a side rolling surface that connects the upper rolling surface to the lower rolling surface; and the rolling mechanism has a side guide roller that rolls on the side rolling surface.

4. A vehicle seat comprising:

a cushion frame;

a base portion that supports the cushion frame; and a guide structure by which the cushion frame is movably guided in a front-rear direction with respect to the base portion, wherein the guide structure is configured such that a rail that is continuous in the front-rear direction, and a rolling mechanism that rolls inside the rail, are interposed between the cushion frame and the base portion;

the rolling mechanism includes an upper guide roller formed in a relatively high position, a lower guide roller formed in a relatively low position, and a roller holder that rotatably supports the upper guide roller and the lower guide roller;

the rolling mechanism is sandwiched by an upper rolling surface of the rail, on which the upper guide roller rolls, and a lower rolling surface of the rail, on which the lower guide roller rolls;

the guide structure is configured such that when an occupant load is input to the cushion frame, the guide roller and the rolling surface at one of a first contact point where the upper guide roller contacts the upper rolling surface or a second contact point where the lower guide roller contacts the lower rolling surface come relatively close together, such that pressure increases, due to a relative position of the roller holder and the rail changing, with the other of the first contact point or the second contact point as a reference point; and the upper guide roller and the lower guide roller are both attached to the roller holder.

5. The vehicle seat according to claim 1, wherein:

the upper guide roller and the lower guide roller are structured and arranged to rotate on the roller holder.

\* \* \* \* \*